(12) United States Patent  
Brazil et al.

(10) Patent No.: US 6,398,991 B1  
(45) Date of Patent: Jun. 4, 2002

(54) PROCESSES FOR MAKING A SILICON CARBIDE COMPOSITION

(75) Inventors: Steven M. Brazil, Benton; Eric G. Wilkins, Bryant, both of AR (US)

(73) Assignee: CoorsTek, Inc., Golden, CO (US)

( * ) Notice: Subject to any disclaimer, the term of this patent is extended or adjusted under 35 U.S.C. 154(b) by 0 days.

(21) Appl. No.: 09/602,798

(22) Filed: Jun. 23, 2000

Related U.S. Application Data

(63) Continuation-in-part of application No. 09/104,664, filed on Jun. 25, 1998, now abandoned.

(51) Int. Cl.⁷ ............................................. C04B 35/573
(52) U.S. Cl. ................ 264/29.1; 264/669; 264/670; 264/682; 501/89; 501/90; 501/91; 501/92
(58) Field of Search ................... 264/669, 670, 264/682, 29.1; 501/89, 90, 91, 92

(56) References Cited

U.S. PATENT DOCUMENTS

| | | | |
|---|---|---|---|
| 2,938,807 A | 5/1960 | Anderson | |
| 4,120,731 A | 10/1978 | Hillig et al. | 264/271 |
| 4,789,506 A | 12/1988 | Kaasprzyk | 264/271 |
| 5,205,970 A | * 4/1993 | Brun et al. | |
| 5,238,619 A | * 8/1993 | McGuigan et al. | |
| 5,296,311 A | 3/1994 | McMurtry et al. | 428/688 |
| 5,395,807 A | 3/1995 | Divaker et al. | 501/88 |
| 5,486,496 A | 1/1996 | Talbert et al. | 501/90 |
| 5,580,834 A | 12/1996 | Pfaff | 501/90 |
| 5,635,430 A | 6/1997 | Divaker et al. | 501/90 |
| 5,643,514 A | 7/1997 | Chwastiak et al. | 264/640 |
| 5,656,563 A | 8/1997 | Chen et al. | 501/90 |

* cited by examiner

*Primary Examiner*—James Derrington  
(74) *Attorney, Agent, or Firm*—Townsend and Townsend and Crew LLP

(57) ABSTRACT

Exemplary silicon carbide ceramic bodies having inclusions therein are produced according to the invention. An exemplary ceramic body includes silicon carbide in major amounts and unreacted particles of an additive in minor amounts which are bonded to the matrix. The particles are dispersed throughout the silicon carbide, and are preferably selected from one or more of the group consisting of boron nitride, aluminum nitride and titanium diboride.

9 Claims, 3 Drawing Sheets

PROCESSES FOR MAKING A SILICON CARBIDE COMPOSITION

CROSS-REFERENCES TO RELATED APPLICATIONS

This application is a continuation in part application Ser. No. of 09/104,664, filed Jun. 25, 1998, now abandoned the complete disclosure of which is herein incorporated by reference.

BACKGROUND OF THE INVENTION

The invention relates generally to the field of ceramic materials and processes for making ceramic materials. More specifically, the invention relates to silicon carbide bodies having particles or inclusions which are dispersed within the bodies.

Silicon carbide is useful in a wide variety of applications due to its tribological characteristics and its outstanding thermal, chemical and mechanical properties. Such applications include, for example, mechanical seals, valve lifters, and other applications where a part is frictionally engaged with another material. For example, in many mechanical seal applications, the seal interfaces are subjected to both a large compressive stress normal to the seal surface and to high rotational speeds or sliding velocities. Such conditions are typically represented by the parameter PV which represents the product of the compressive stress and the sliding velocity.

When such a mechanical seal is used in a pump or agitator, the mechanical seal should provide adequate sealing of the working fluid. Conveniently, the working fluid may also serve to lubricate and cool the seal interface. If sufficient lubrication and cooling is not provided, excessive wear or catastrophic failure of the mechanical seal may result. For example, if insufficient fluid is provided at the seal interface during operation, the lubricant can vaporize due to the heat produced and cause catastrophic failure.

Hence, when a silicon carbide body is used in a seal or other bearing face which runs against the face of another material, the seal or bearing face should be exposed to a lubricating and cooling fluid (or used in fluid applications) so that a film may be produced between the sliding surfaces to lubricate and cool the surfaces, thereby reducing friction, wear, and temperature as well as catastrophic failure potential. Further, proper lubrication will tend to minimize power consumption.

To facilitate proper lubrication, a variety of silicon carbide materials have been proposed. These include both reaction bonded silicon carbide materials and sintered silicon carbide materials with special modifications to the standard product. The reaction bonded silicon carbide materials are produced by placing a carbon containing preform in contact with molten silicon metal. As examples of such processes, U.S. Pat. Nos. 4,536,449 and 4,120,731 describe a reaction bonded silicon carbide body having secondary lubricating particles dispersed therein. The complete disclosures of both these patents are herein incorporated by reference.

The above processes have met with limited success for a variety of reasons. For example, the processes used to produce such materials are often complex and can therefore be relatively expensive. For instance, as recognized in U.S. Pat. No. 5,656,563, the disclosure of which is herein incorporated by reference, it is difficult to incorporate large amounts of graphite into a ceramic matrix without causing cracks to occur in the microstructure or without increasing the material's porosity. Producing a reaction bonded silicon carbide/graphite material is difficult because such a material typically has a residual silicon phase which limits corrosion resistance due to a reaction with the silicon in some chemical applications and also reacts with the included graphite to convert it to SiC. Further, controlling the reaction bonding process to obtain fully reacted and fully dense parts is difficult.

Hence, it would be desirable to provide silicon carbide materials having improved lubricity while maintaining the integrity of the microstructure. It would further be desirable to provide exemplary processes for making such materials. Such processes should be relatively simple so that the overall cost of the material may be reduced. Such a silicon carbide material should also be useful in applications having a high PV limit or temporary dry running applications while reducing the chances of catastrophic failure, excessive wear, and power consumption.

SUMMARY OF THE INVENTION

The invention provides exemplary silicon carbide ceramic bodies and processes for making such ceramic bodies. The silicon carbide ceramic bodies of the invention comprise silicon carbide in major amount and unreacted particles of an additive in minor amount. The particles are dispersed throughout the silicon carbide and provide a degree of lubricity when the ceramic body is operated against an operating surface. The additive comprises a material that is inert with respect to silicon so that the additive may remain intact during the manufacturing process. Exemplary additives which may be employed include: boron nitride, aluminum nitride, titanium diboride, and the like.

In one particular aspect, the ceramic body comprises from about one weight percent to about 25 weight percent of the additive. Preferably, the ceramic body comprises from about 12 weight percent to about 15 weight percent of boron nitride. In another aspect, the ceramic body comprises at least about 75 weight percent of silicon carbide.

The ceramic body may be fashioned into a variety of parts or components using diamond abrasive grinding wheels as the fired ceramic body is not machineable with single point tooling. For example, the ceramic body may comprise a pump seal, a bearing, a turbine component, a pump lifter, a nozzle, or the like.

The invention further provides an exemplary process for producing a reaction bonded silicon carbide body. According to the process, an additive which is inert with respect to silicon is incorporated with a carbon source and a silicon carbide source to form a raw batch mixture. The mixture is then exposed to molten silicon, siliconized, to produce a reaction bonded silicon carbide body having particles of the additive dispersed therein.

Prior to siliconization, an organic binder is preferably incorporated into the raw batch mixture to provide green strength and single point tooling machinability. The raw batch mixture is then compacted into a green body, which in turn, is exposed to a liquid silicon metal to produce the reaction bonded silicon carbide body.

Also prior to siliconization, an agent which is reactive with respect to the additive and the silicon carbide matrix is preferably incorporated into the raw batch mixture. This agent preferably comprises one or a mixture of the following: titanium, titanium dioxide, boron, boric acid, nickel, cobalt, manganese, or any other materials which is reactive with respect to the particular additive.

Such a process is particularly advantageous in that a lubricating material may rather easily be dispersed within the silicon carbide raw batch prior to compaction, thereby reducing the manufacturing cost. Moreover, because the additive does not react with the molten silicon metal, the integrity of the resulting microstructure is generally not compromised. Moreover, the active agent bonds with the additive and the silicon carbide matrix, thereby providing enhanced retention of the additive during operation conditions.

The carbon source for the reaction bonding process may comprise any one of a variety of carbon sources including graphite, carbon black, pyrolized resins, and the like. In one exemplary aspect, the silicon carbide powder is mixed into a slurry of the carbon source, the reactive agent, and the binder to form a secondary slurry. The secondary slurry is then dried, such as by using a spray dryer, to form a stock. The stock is then blended with the additive prior to compaction. The invention may employ the use of a wide variety of organic binders including polyvinyl alcohol, acrylic resin, coal tar pitch, long chain fatty materials, metallic stearates, sugars, starches, alginates, polystyrene, and the like.

In one particularly preferable embodiment, the raw batch mixture includes about 10 weight percent to about 30 weight percent carbon source, about 4 weight percent to about 8 weight percent reactive agent, about 88 weight percent to about 55 weight percent silicon carbide powder, about 1 weight percent to about 10 weight percent binder, and about 1 weight percent to about 25 weight percent additive. After compaction into the green body, the green body is preferably heated to a temperature in the range from about 1500° C. to about 2000° C. to facilitate exposure of the liquid silicon metal to the green body.

By using a raw batch mixture having about 10 wt % to about 30 wt % carbon source, and about 88 weight percent to about 55 (and more preferably about 60) weight percent silicon carbide powder, a more complete conversion of the carbon into silicon carbide is achieved. Because of the lack of residual graphite, a material is produced having a relatively high density and which is relatively hard, i.e. hard enough that is not machineable using single point tooling. For example, a silicon carbide body may be produced having an average density of at least about 2.80 g/cc, more preferably at least about 2.95 g/cc. The high density also contributes to the stiffness, hardness, flexural strength, thermal conductivity, abrasion resistance, and other physical characteristics that allow the material to be used as a mechanical seal, among other applications.

In another embodiment, the invention provides an exemplary raw batch mixture for producing a reaction bonded ceramic body. The raw batch comprises a carbon powder and a silicon powder in major amount. An additive in minor amount is also included. The additive preferably comprises boron nitride, aluminum nitride and/or titanium diboride. A reactive agent in minor amount is also included. The reactive agent preferably comprises titanium or titanium dioxide. In one aspect, a binder in minor amount is also provided. In one particularly preferable aspect, the additive comprises from about 1 weight percent to about 25 weight percent boron nitride and the reactive agent comprises from about 4 weight percent to about 8 weight percent.

DESCRIPTION OF THE SPECIFIC EMBODIMENTS

Figure 1:
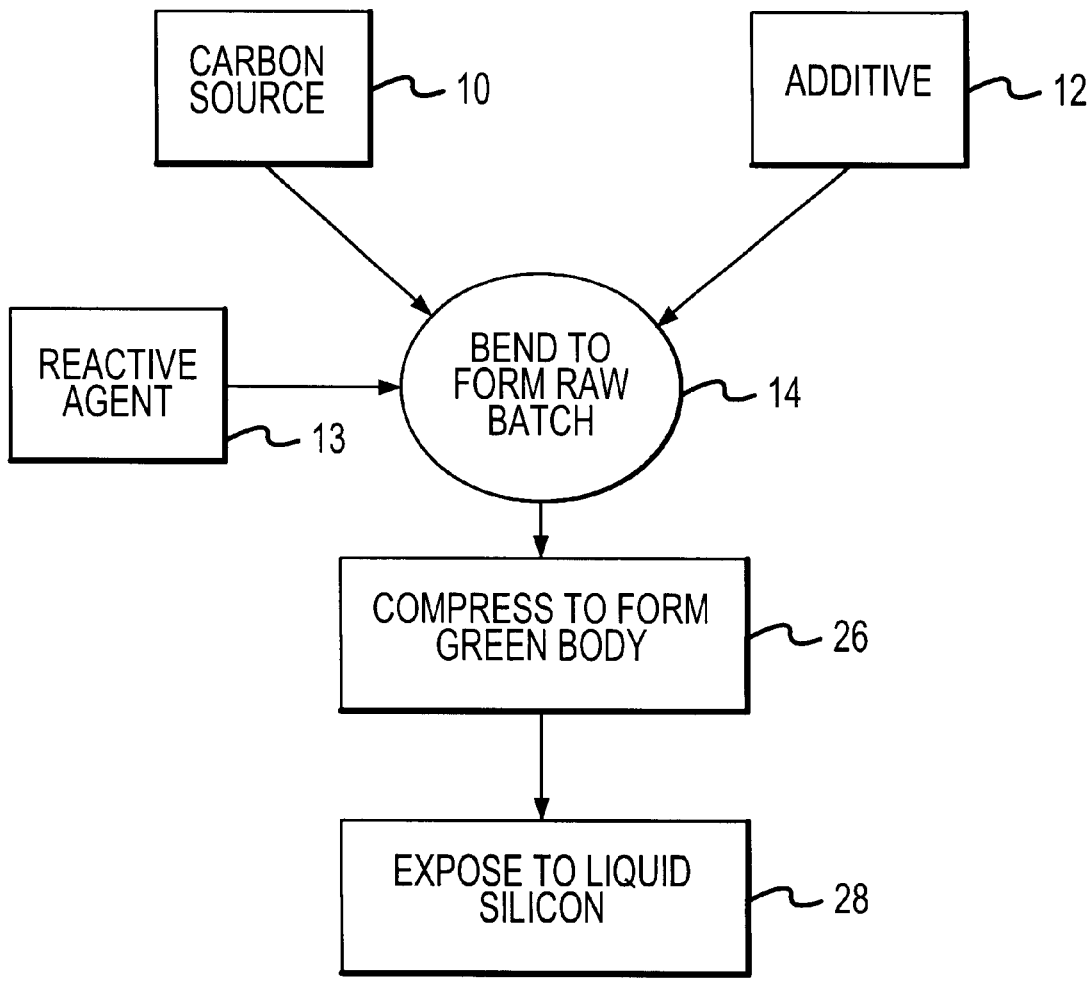
FIG. 1 is a flowchart illustrating an exemplary process for producing a reaction bonded silicon carbide body according to the invention.

The invention provides exemplary silicon carbide ceramic bodies and methods for producing such silicon carbide ceramic bodies. In a broad sense, the ceramic bodies of the invention comprise a silicon carbide material in which unreactive particles of an additive are dispersed and bonded into the matrix with an agent. The unreactive particles may include any one of a variety of materials which are inert with respect to molten silicon. In this way, the particles will remain intact while producing the silicon carbide ceramic body and will become bonded to the SiC matrix. Exemplary additives that may be employed by the invention include boron nitride, aluminum nitride, and titanium diboride, or mixtures thereof, with boron nitride being preferred. The use of boron nitride is particularly advantageous in that it also acts as a lubricant when the ceramic body is operated against an operating surface. Exemplary additives that may be employed by the invention include titanium and titanium dioxide.

The use of such an additive is particularly advantageous in that the additive is inert with respect to the molten silicon. In this way, the resulting ceramic body may be manufactured simply by including the additive in particle form and then reaction bonding the green body. As such, the manufacturing process is significantly simplified, thereby reducing the overall cost of the ceramic body. The resulting ceramic body also includes an exemplary microstructure, resulting in a robust and durable product which retains the additive, and has a density of at least 2.80 g/cc. As previously described, the additive may serve as a lubricant in operations where the ceramic body is in sliding contact with another surface. In this manner, the time to failure in the event of dry running is increased and the risk of dry running the part is mitigated. Wear and power consumption are also reduced.

Merely by way of example, silicon carbide ceramic bodies produced according to the invention are useful in a wide variety of applications. For example, the ceramic bodies of the invention are useful in applications where having a high PV is a requirement. Such applications can include, for example, seal members, bearings, pump lifters, turbine components, valve guides, split seals, and the like. The unreacted additive (or inclusions) of the invention is provided to reduce the frictional drag on a mating surface through lubricating properties or hydropads. The inclusions may also act as liquid reservoirs in the event that the inclusion wears below the matrix surface. This provides a "hydropad" which causes slight separation of the faces and thus reduces wear.

Because the inclusions are unreactive with respect to the silicon, the inclusions may be provided with essentially any size. In this way, the amount of lubricity may easily be modified by altering the size and concentration of the additive. Preferably, the additive has a mean particle size in the range from about 100 microns to about 300 microns, and more preferably from about 150 microns to about 250 microns.

Referring now to FIG. 1, an exemplary method for producing a reaction bonded silicon carbide ceramic body will be described. The process begins by producing a raw batch mixture by combining a matrix or carbon source 10 with an additive 12. Carbon source 10 and additive 12 are blended together with a reactive agent 13 to form a raw batch mixture 14 as shown. A wide variety of carbon sources may be employed including graphite, carbon black, pyrolized resins, furfural alcohol-glycol mixtures, and the like. Preferably, carbon source 10 will be in powder form, typically having a particle size in the range from about 0.2 micron to about 2 micron, and more preferably about 0.7 micron. Optionally, a silicon carbide powder may be mixed with carbon source 10 prior to blending with additive 12.

Figure 2:
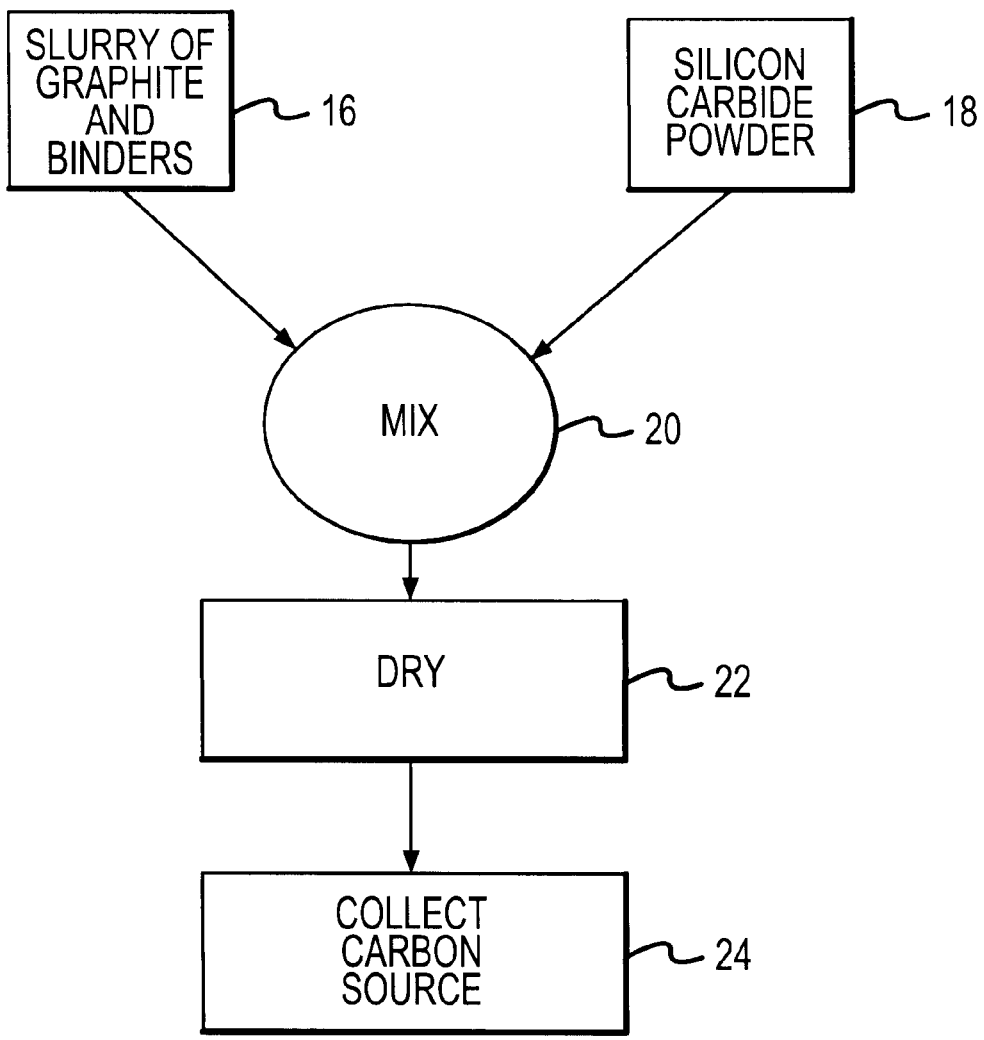
FIG. 2 illustrates an exemplary process for producing a carbon source that is employed in the process of FIG. 1 according to the invention.

Referring now to FIG. 2, one exemplary process for producing carbon source 10 will be described, it being appreciated that a wide variety of processes may be employed to produce carbon source 10. Initially, a slurry of graphite and binders 16 is mixed with silicon carbide powder 18 as illustrated in step 20. Slurry 16 preferably comprises a commonly commercially available colloidal graphite slurry containing one or more binders. For example, binders that may be employed include polyvinyl alcohol, acrylic resin, coal tar pitch, long chain fatty materials, metallic stearates, sugars, starches, alginates, polystyrene, and the like. Such a graphite slurry comprises water, graphite and various binders. Preferably, the colloidal slurry comprises about 80 percent water and about 20 percent solids, of which about 2 percent to about 5 percent is the binder or binders.

Silicon carbide powder 18 preferably comprises a microgrit class silicon carbide powder, typically having a size in the range from about 240 grit to about 1200 grit, and more preferably about 600 grit. However, it will be appreciated that other grit classes may also be used. Reactive agent 13 is added to the prespray slurry. Exemplary reactive agents include but are not limited to titanium, titanium dioxide, nickel, cobalt, manganese, and the like. When slurry 16 is mixed with silicon carbide powder 18 a secondary or pre-spray slurry is formed. The secondary slurry preferably comprises about 20 weight percent to about 100 weight percent colloidal slurry, and more preferably about 70 weight percent colloidal slurry and about 0 weight percent to about 80 weight percent silicon carbide powder, and more preferably about 30 weight percent silicon carbide powder.

The secondary slurry is dried as illustrated by step 22. The secondary slurry may be dried by any conventional means, such as by employing a Bowen commercial spray dryer. Alternatively, a variety of drying processes may be used as known in the art, including flash drying, spin drying, fluidized beds, and the like.

Once dried, a stock is produced. The stock is collected as illustrated in step 24 and is used as carbon source 10 as described in FIG. 1.

Referring back now to FIG. 1, additive 12 comprises a material that is inert with respect to molten silicon metal so that the additive will not react with the silicon metal during the reaction bonding process. Exemplary additives include boron nitride, aluminum nitride and titanium diboride, with boron nitride being preferred. Additive 12 is preferably provided in particultated form, with the particles typically having a mean particle size in the range from about 100 micron to about 300 micron, and more preferably about 150 micron to about 250 micron. Since additive 12 will remain substantially unreacted with the molten silicon metal, the particle size used to form the raw batch will be essentially the same size as the inclusions remaining within the ceramic body. In this way, the size of the inclusions within the ceramic body may be precisely controlled. Since reactive agent 13 is reactive to both the silicon carbide matrix and the additive, the additive particles will be bonded to the matrix. In this way the additive particles are firmly retained in the matrix.

Carbon source 10 and additive 12 may be mixed or blended using equipment generally known in the art. The resulting raw batch mixture preferably includes from about 10 weight percent to about 50 weight percent, and more preferably from about 10 weight percent to about 30 weight percent carbon source, about 88 weight percent to about 30 weight percent, more preferably from about 88 weight percent to about 55 weight percent silicon carbide powder, and most preferably from about 88 weight percent to about 60 weight percent silicon carbide powder, about 1 weight percent to about 10 weight percent binder, about 4 weight percent to about 8 weight percent reactive agent, and about 1 weight percent to about 25 weight percent additive. In one preferred embodiment, the additive comprises boron nitride, and is about 12 weight percent to about 15 weight percent of the raw batch mixture. In one preferred embodiment, the reactive agent comprises titanium dioxide and is about 6 weight percent of the raw batch mixture.

The use of silicon carbide powder in the range from about 88 weight percent to about 60 weight percent is particularly advantageous in producing silicon carbide parts having a relatively high density and hardness. For example, the density may be greater than about 2.80 g/cc, and the hardness of the matrix may be greater than about 19 GPa. In this way, such parts may be used in applications having high PV requirements.

As illustrated in step 26, the raw batch mixture is formed and compressed into a green body. Green forming of the raw batch mixture may be performed according to any standard green forming technique. As one example which is particularly useful when forming a seal member, the raw batch mixture is placed into a rubber sack having a mandrel and then compressed using a commercially available isostatic press. Any one of a variety of commercially available compression techniques may be used in place of isostatic pressing. For example, the raw batch mixture may be compressed using isostatic pressing, dry pressing, extrusion, and the like. Following green forming, the green body may be shaped as specified by the end user as is known in the art.

The green body is then siliconized by exposing the green body to liquid or molten silicon as illustrated in step 28. Exposure to the liquid silicon metal may be accomplished by a variety of techniques, including wicking, direct contact, vapor exposure, and the like. Preferably, exposure to the liquid silicon will occur within a furnace having a temperature in the range from about 1500° C. to about 2000° C. in an inert gas at atmospheric pressure. The green body remains within the furnace for a time sufficient to allow the silicon metal to infiltrate the entire green body. As such, the length of time that the green body is kept within the furnace is shape and size dependent. After being exposed to the liquid silicon metal, the reaction bonding process is complete and a reaction bonded silicon carbide ceramic body is produced.

Figure 3:
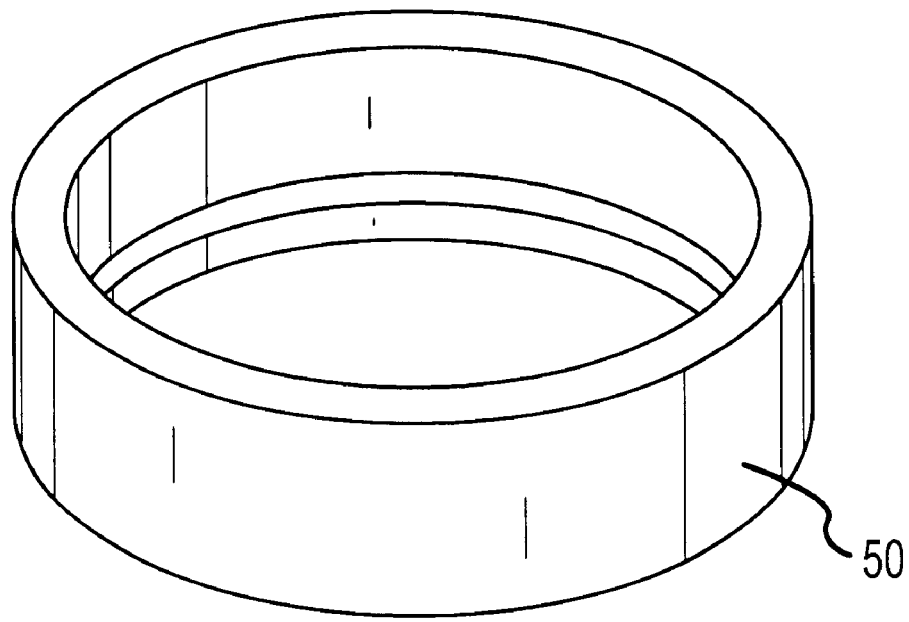
FIG. 3 illustrates an exemplary seal member that is constructed of a silicon carbide body having unreacted particles of an additive dispersed therein according to the invention.

Shown in FIG. 3 is a seal member 50 that may be produced according to the processes described herein. In addition to producing seal members, the processes of the invention may be employed to produce bearings, valves, nozzles, valve guides, split seals, and other wear parts.

Example

A reaction bonded silicon carbide ceramic body was produced according to the following process. A pre-spray slurry was formed by combining a colloidal graphite slurry with a silicon carbide powder. The colloidal slurry was a commonly available commercial product familiar to those skilled in the art. The silicon carbide powder was a commonly commercially available 600 grit silicon carbide powder, sold under the brand name of ESK, Kempten, Germany. The colloidal slurry was 70 weight percent and the silicon carbide powder was 30 weight percent. A reactive agent was added to the pre-spray slurry. The reactive agent was titanium dioxide commonly commercially available. The reactive agent was added at 8 weight percent of the solids of the prespray slurry. The pre-spray slurry was then spray dried in a commercial spray dryer to form a reaction bonded stock. The stock was mixed with boron nitride using a twin shell blender. The raw batch mixture included 12 weight percent boron nitride and 88 weight percent reaction bonded stock. The boron nitride was a HCJ-48 grade boron nitride, commercially available from Advanced Ceramics, Cleveland, Ohio.

The raw batch mixture was placed in a rubber sack having a mandrel and subjected to isostatic pressing in a pressure vessel having a pressure of about 5000 psi for about two minutes. The green body was removed from the sack and had dimensions of approximately 100 mm (outer diameter), 60 mm (inner diameter), and 180 mm thick. The green body was then placed in a vacuum furnace. The green body was placed in the furnace when cold and then ramped up to a temperature of 1800° C. at atmospheric pressure of argon gas. While in the furnace, the green body was exposed to a liquid silicon metal using a wicking technique. The green body was in the furnace for fourteen hours. The resulting body had a density of about 2.95 g/cc, and a hardness of the matrix of about 19 GPa.

When removed from the furnace, the resulting reaction bonded silicon carbide ceramic body experienced essentially no shrinkage. The resulting reaction bonded silicon carbide ceramic body had boron nitride inclusions ranging in size from about 100 microns to about 600 microns dispersed throughout the ceramic body and bonded to the matrix.

The invention has now been described in detail. However, it will be appreciated that the invention may be carried out in ways other than those illustrated in the aforesaid specific Examples. Accordingly, the scope of this invention is not to be limited by those specific Examples, but rather is to be accorded the full scope represented in the following claims.

What is claimed is:

1. A process for producing a reaction bonded silicon carbide body, the process comprising:

combining a carbon source, silicon carbide powder, a binder and an additive selected from one or more of the group consisting of boron nitride, aluminum nitride and titanium diboride to form a raw batch mixture, wherein raw batch mixture includes about 10 wt % to about 30 wt % carbon source, and about 88 wt % to no less than 55 wt % silicon carbide powder;

compacting the raw batch mixture into a green body; and exposing the green body to a liquid silicon metal to produce a reaction bonded silicon carbon body having a density of at least 2.8 g/cc.

2. A process as in claim 1, wherein raw batch mixture includes about 88 wt % to no less than 60 wt % silicon carbide powder.

3. A process as in claim 1, wherein the carbon source is selected from the group consisting of graphite, carbon black, and pyrolized resins.

4. A process as in claim 1, wherein the raw batch mixture further includes about 1 wt % to about 5 wt % binder, about 4 wt % to about 8 w % of a reactive agent and about 1 wt % to about 25 wt % additive.

5. A process as in claim 4, wherein the binder is selected from one or more of the group consisting of polyvinyl alcohol, acrylic resins, coal tar pitch, long chain fatty materials, metallic stearates, sugars, starches, alginates and polystyrene, and wherein the reactive agent is selected from one or more of the group consisting of titanium, titanium dioxide, nickel, cobalt, and manganese.

6. A process as in claim 1, wherein the combining step further comprises mixing the silicon carbide powder into a slurry of the carbon source, a reactive agent, and the binder to form a secondary slurry, drying the secondary slurry to form a stock, and blending the stock with the additive.

7. A process as in claim 1, further comprising heating the green body to a temperature in the range from about 1500° C. to about 2000° C. during the siliconization step.

8. A method for producing a reaction bonded silicon carbide body, the method comprising:

incorporating boron nitride in a mixture of carbon and silicon carbide powders to form a raw batch mixture including 88 wt % to 55 wt % silicon carbide powder; and siliconizing the mixture to produce a reaction bonded silicon carbide body having a density of at least 2.80 g/cc and boron nitride particles dispersed therein.

9. A method as in claim 8, further comprising incorporating a reactive agent into the mixture to bond the boron nitride to the silicon carbide body.

* * * * *